US012714040B2

(12) United States Patent
Steininger

(10) Patent No.: US 12,714,040 B2
(45) **Date of Patent: *Aug. 25, 2026**

(54) DEVICE FOR HARVESTING TIMBER

(71) Applicant: Werner Steininger, Peuerbach (AT)

(72) Inventor: Werner Steininger, Peuerbach (AT)

( * ) Notice: Subject to any disclaimer, the term of this patent is extended or adjusted under 35 U.S.C. 154(b) by 361 days.

This patent is subject to a terminal disclaimer.

(21) Appl. No.: 18/561,955

(22) PCT Filed: May 24, 2022

(86) PCT No.: PCT/EP2022/064011
§ 371 (c)(1),
(2) Date: Nov. 17, 2023

(87) PCT Pub. No.: WO2022/253632
PCT Pub. Date: Dec. 8, 2022

(65) Prior Publication Data
US 2024/0224897 A1 Jul. 11, 2024

(30) Foreign Application Priority Data
Jun. 2, 2021 (AT) .............................. A 50444/2021

(51) Int. Cl.
*A01G 23/091* (2006.01)

(52) U.S. Cl.
CPC .................................. *A01G 23/091* (2013.01)

(58) Field of Classification Search
CPC .... A01G 23/081; A01G 23/087; A01G 23/08; A01G 23/091
See application file for complete search history.

(56) References Cited

U.S. PATENT DOCUMENTS 4,219,059 A * 8/1980 Albright .............. A01G 23/091 144/34.1
5,101,872 A * 4/1992 Scheuren ............. A01G 23/091 144/34.1
(Continued)

FOREIGN PATENT DOCUMENTS

CA 2 650 748 7/2010
EP 3 097 772 11/2016
(Continued)

OTHER PUBLICATIONS

Int'l Search Report (Form PCT/ISA/210) conducted in Int'l Appln. No. PCT/EP2022/064011 (Sep. 22, 2022).
(Continued)

*Primary Examiner* — Bobby Yeonjin Kim
(74) *Attorney, Agent, or Firm* — GREENBLUM & BERNSTEIN, P.L.C.

(57) ABSTRACT

Device for timber harvesting having a felling head which includes a gripper and saw unit and a tilting device. The gripper and saw unit has gripper arms which can be actuated by a first hydraulic cylinder and a cutting element which can be pivoted out by a second hydraulic cylinder, and can be pivoted from a depositing position into a cutting position for the harvested material with the aid of the tilting device which can be actuated by a third hydraulic cylinder. The first hydraulic cylinder is connected to a first hydraulic line for opening the gripper arms and to a second hydraulic line for closing the gripper arms. Through interaction of a first hydraulic valve, a second hydraulic valve and a third hydraulic valve, the gripper and saw unit maintains its position even when the hydraulic lines are not pressurized and enables precise positioning on the harvested material.

7 Claims, 4 Drawing Sheets

(56) References Cited

U.S. PATENT DOCUMENTS

Figure 1:
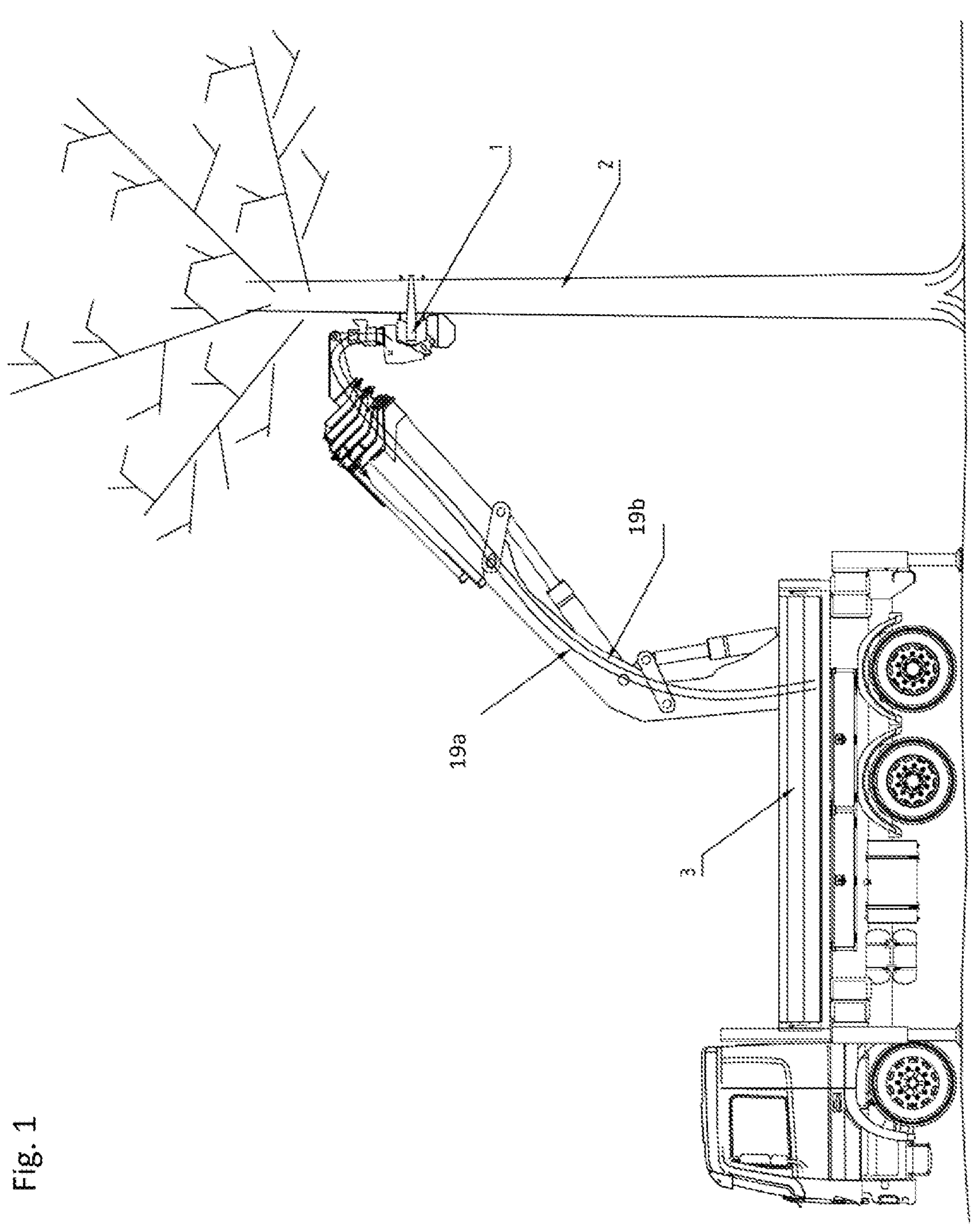

| | | | | |
|---|---|---|---|---|
| 6,408,906 | B1 * | 6/2002 | Moon | A01G 23/091 144/34.1 |
| 2004/0020561 | A1 * | 2/2004 | Brown | A01G 23/091 144/34.1 |
| 2018/0125007 | A1 * | 5/2018 | Gierkink | A01G 23/081 |

FOREIGN PATENT DOCUMENTS

| | | | | |
|---|---|---|---|---|
| IT | 201800007247 | | 1/2020 | |
| WO | WO-0033641 | A1 * | 6/2000 | A01G 23/081 |
| WO | 2011/078673 | | 6/2011 | |
| WO | WO-2011078673 | A1 * | 6/2011 | A01G 23/081 |

OTHER PUBLICATIONS

Int'l Written Opinion (Form PCT/ISA/237) conducted in Int'l Appln. No. PCT/EP2022/064011 (Sep. 22, 2022).

* cited by examiner 1
2
19b
19a
3

DEVICE FOR HARVESTING TIMBER

The invention relates to a device for timber harvesting having a hydraulically controlled felling head, which can be attached to the boom arm of a vehicle and comprises a gripper and saw unit and a tilting device, wherein the gripper and saw unit has at least one pair of two gripper arms for the harvested material, which can be actuated by a first hydraulic cylinder and pivoted between an open and closed state, and a cutting element for cutting through the harvested material, which can be pivoted out by a second hydraulic cylinder, and can be pivoted from a depositing position into a cutting position for the harvested material by means of the tilting device which can be actuated by a third hydraulic cylinder, wherein the first hydraulic cylinder is connected to a first hydraulic line for opening the gripper arms and to a second hydraulic line for closing the gripper arms, according to the preamble of claim 1.

Devices of this type are used for timber harvesting, wherein an operator controls a boom arm from the vehicle in such a way that gripper arms arranged on a gripper and saw unit embrace the harvested material, such as a tree trunk, wherein a closing pressure is subsequently exerted on the gripper arms via a corresponding hydraulic system via the second hydraulic line mentioned at the beginning and a first hydraulic cylinder, which fix the tree trunk relative to the boom arm via a pincer-like movement. Once the tree trunk has been fixed, the cutting element can be pivoted using a second hydraulic cylinder so that the tree trunk is cut through. The cutting element is designed as a chainsaw and is usually pivotably mounted in a saw box, wherein it can be put into operation using a hydraulic motor arranged in the saw box and swung out of the saw box using a hydraulically operated pivot drive in order to cut through a tree trunk held by the gripper arms in an area below the gripper arms. After cutting through the tree trunk, the gripper and saw unit can be pivoted using the tilting device so that the gripper arms are moved from their cutting position, in which the gripper arms are essentially horizontally oriented and their gripper pivot axes are correspondingly vertical, to a depositing position, in which the gripper arms are essentially vertically oriented and their gripper pivot axes are correspondingly horizontal. The severed tree trunk can then be deposited in a controlled manner by activating the boom arm accordingly, wherein the gripper arms are opened via the first hydraulic line mentioned above and a corresponding resetting movement of the first hydraulic cylinder in order to release the severed tree trunk. With the aid of the third hydraulic cylinder and the tilting device, the gripper and saw unit can be moved from its depositing position back to its cutting position.

The hydraulically actuated processes of gripping and cutting as well as opening the gripper and pivoting the tilting device are usually implemented with the aid of pressure sequencing controls. A hydraulic sequencing valve is used to close the gripper and, once the gripper is fully closed, to start up and pivot out the cutting element via the same hydraulic line. With the aid of a further hydraulic sequencing valve, both the opening of the gripper and, after the gripper has been fully opened, the actuation of the tilting device for pivoting the gripper and saw unit into their cutting position are accomplished via a further hydraulic line in the depositing position. A hydraulic valve is used to switch between the two hydraulic lines, but at least one hydraulic line must have a connection to the hydraulic fluid tank when not connected in order to enable the cutting element to retract after the cut has been completed. This connection to the hydraulic fluid tank means that after the gripper is fully opened and the tilting device is actuated, it sinks back down by gravity after switching to the unconnected state, for example to position the felling head on the harvested material. This makes clean positioning on the harvested material more difficult, which is a disadvantage during operation.

It is therefore the object of the invention to realize a device for timber harvesting with a hydraulically controlled felling head which avoids this disadvantage and enables the cutting position of the gripper and saw unit to be fixed during positioning on the harvested material.

These objects are realized by the features of claim 1. Claim 1 relates to a device for timber harvesting with a hydraulically controlled felling head which can be attached to the boom arm of a vehicle and comprises a gripper and saw unit and a tilting device, wherein the gripper and saw unit has at least one gripper pair of two gripper arms for the harvested material, which can be actuated by a first hydraulic cylinder and pivoted between an open and closed state, and a cutting element for cutting through the harvested material, which can be pivoted out by a second hydraulic cylinder, and can be pivoted from a depositing position into a cutting position for the harvested material by means of the tilting device which can be actuated by a third hydraulic cylinder, wherein the first hydraulic cylinder is connected to a first hydraulic line for opening the gripper arms and to a second hydraulic line for closing the gripper arms. According to the invention, it is proposed here that a first hydraulic valve provided with a non-return valve is provided, which is connected on the input side to the first hydraulic line, and is connected on the output side to a second hydraulic valve, which is connected to the third hydraulic cylinder designed as a single-acting hydraulic cylinder, and to a third hydraulic valve, via which the second hydraulic valve is connected to the first hydraulic line, wherein the third hydraulic valve is designed to block when pressure is applied to the first hydraulic line and to open when pressure is applied to the second hydraulic line, and the second hydraulic valve is designed to conduct hydraulic fluid from the first hydraulic valve to the third hydraulic cylinder when a switch is actuated by the gripper arms pivoted into their open state, and to conduct hydraulic fluid from the third hydraulic cylinder to the third hydraulic valve when the switch is not actuated when the gripper arms are closed.

If the gripper is to be opened, the first hydraulic cylinder is actuated using the first hydraulic line and the gripper opens. With the aid of the first hydraulic valve, hydraulic fluid is fed from the first hydraulic line to the second hydraulic valve, which is initially still blocked because it is only opened when the switch is actuated. In addition, hydraulic fluid is also conducted to the third hydraulic valve, which is also still blocking because, according to the invention, it blocks when pressure is applied to the first hydraulic line.

Only when the gripper is fully open and thus in its open position does it activate the second hydraulic valve via the switch, which thus becomes conductive and allows hydraulic fluid to flow from the first hydraulic valve into the third hydraulic cylinder of the tilting device. The third hydraulic cylinder is thus actuated, causing the tilting device to pivot the gripper and saw unit into its cutting position.

The gripper and saw unit can then be positioned on the harvested material. The two hydraulic lines are depressurized in this case. The third hydraulic valve remains in the blocking state. The hydraulic fluid cannot flow out of the third hydraulic cylinder via the first hydraulic valve either, as it is fitted with a non-return valve. The gripper and saw unit thus maintains its position and enables precise positioning on the harvested material.

If the gripper is to be closed, the first hydraulic cylinder is actuated using the second hydraulic line and the gripper closes. The third hydraulic valve is now opened so that hydraulic fluid can flow out of the third hydraulic cylinder via the second hydraulic valve and the third hydraulic valve into the first hydraulic line as soon as the harvested material has been cut through and pivots the tilting device with its own weight, bringing the third hydraulic cylinder back into its retracted position.

For overload protection for the third hydraulic cylinder, the first hydraulic valve is preferably designed to direct hydraulic fluid from the second hydraulic valve to the first hydraulic line if a first limit value of the pressure applied on the output side is exceeded.

Furthermore, a fourth hydraulic valve is provided as a load-holding valve with an overload protection for the first hydraulic cylinder, which is connected on the input side to the second hydraulic line and on the output side to the first hydraulic cylinder, wherein the fourth hydraulic valve is designed to conduct hydraulic fluid from the first hydraulic cylinder to the second hydraulic line when a second limit value of the output-side pressurization is exceeded. The load-holding valve ensures that the pressure in the first hydraulic cylinder is maintained, even if the second hydraulic line is depressurized. The fourth hydraulic valve thus prevents the gripper from opening unintentionally, but allows the gripper to open in the event of an imminent overload.

In addition, a fifth hydraulic valve can be provided, which is connected on the input side to the second hydraulic line and on the output side to a hydraulic motor and the second hydraulic cylinder for the cutting element, wherein the fifth hydraulic valve is designed to conduct hydraulic fluid from the second hydraulic line to the hydraulic motor and the second hydraulic cylinder when a third limit value of the input-side pressurization is exceeded. The third limit value is selected so that the fifth hydraulic valve only opens when the gripper is fully closed. In this way, the cutting element is also not put into operation until the gripper is completely closed. After start-up, the saw is swung out via the hydraulic motor using the second hydraulic cylinder.

Furthermore, it is proposed that a first accumulator for leakage oil from the hydraulic motor is provided, which is connected to the first hydraulic line. This first accumulator collects leakage oil from the hydraulic motor and returns it to the first hydraulic line after the sawing process has been completed.

In order to prevent the hydraulic motor from looping incorrectly when pressure is applied to the first hydraulic line, a sixth hydraulic valve is proposed, which is connected on the input side to the first hydraulic line and on the output side to the hydraulic motor, wherein the sixth hydraulic valve is designed to conduct hydraulic fluid from the hydraulic motor into the first hydraulic line and to block it in the opposite direction.

Furthermore, a second accumulator for hydraulic fluid of the second hydraulic cylinder is proposed for the resetting movement of the second hydraulic cylinder. With the aid of the second accumulator, the cutting element is thus swung back into place after the cutting process has been completed.

Figure 2:
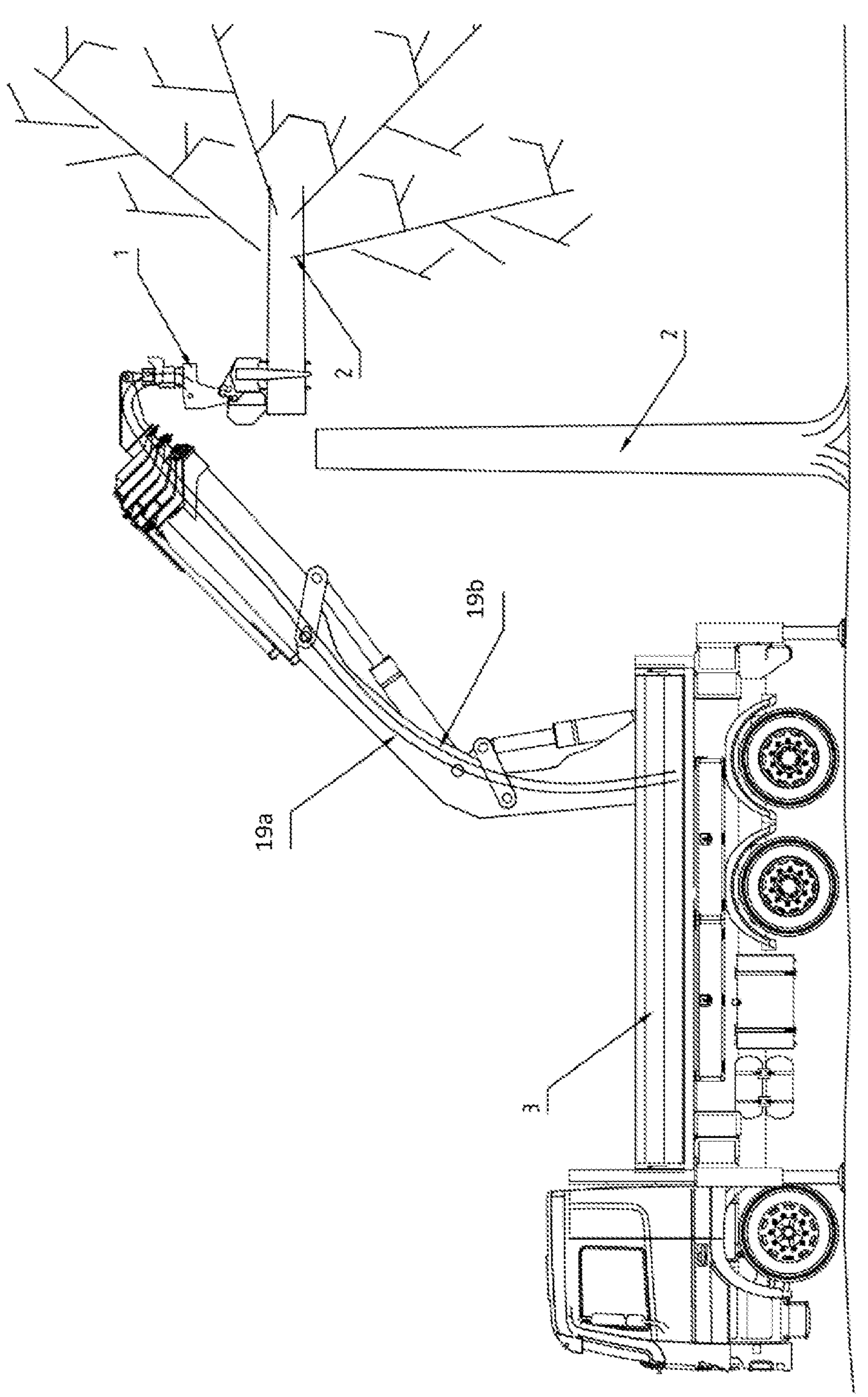
Figure 3A:
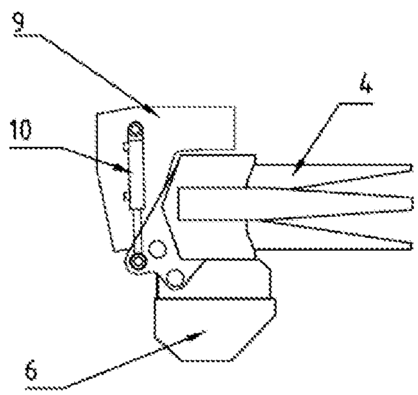
Figure 3B:
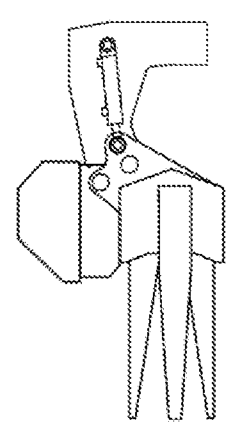
Figure 4A:
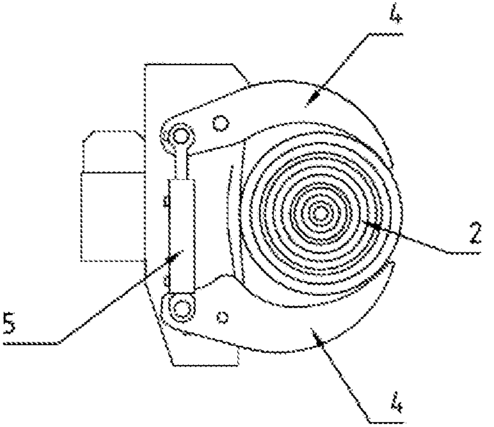
Figure 4B:
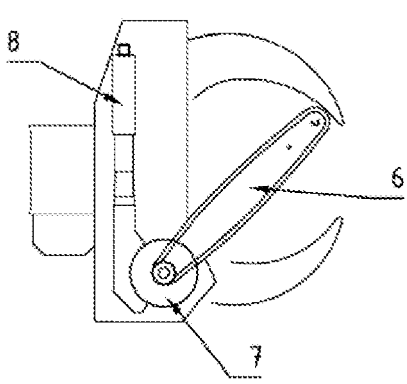
Figure 5:
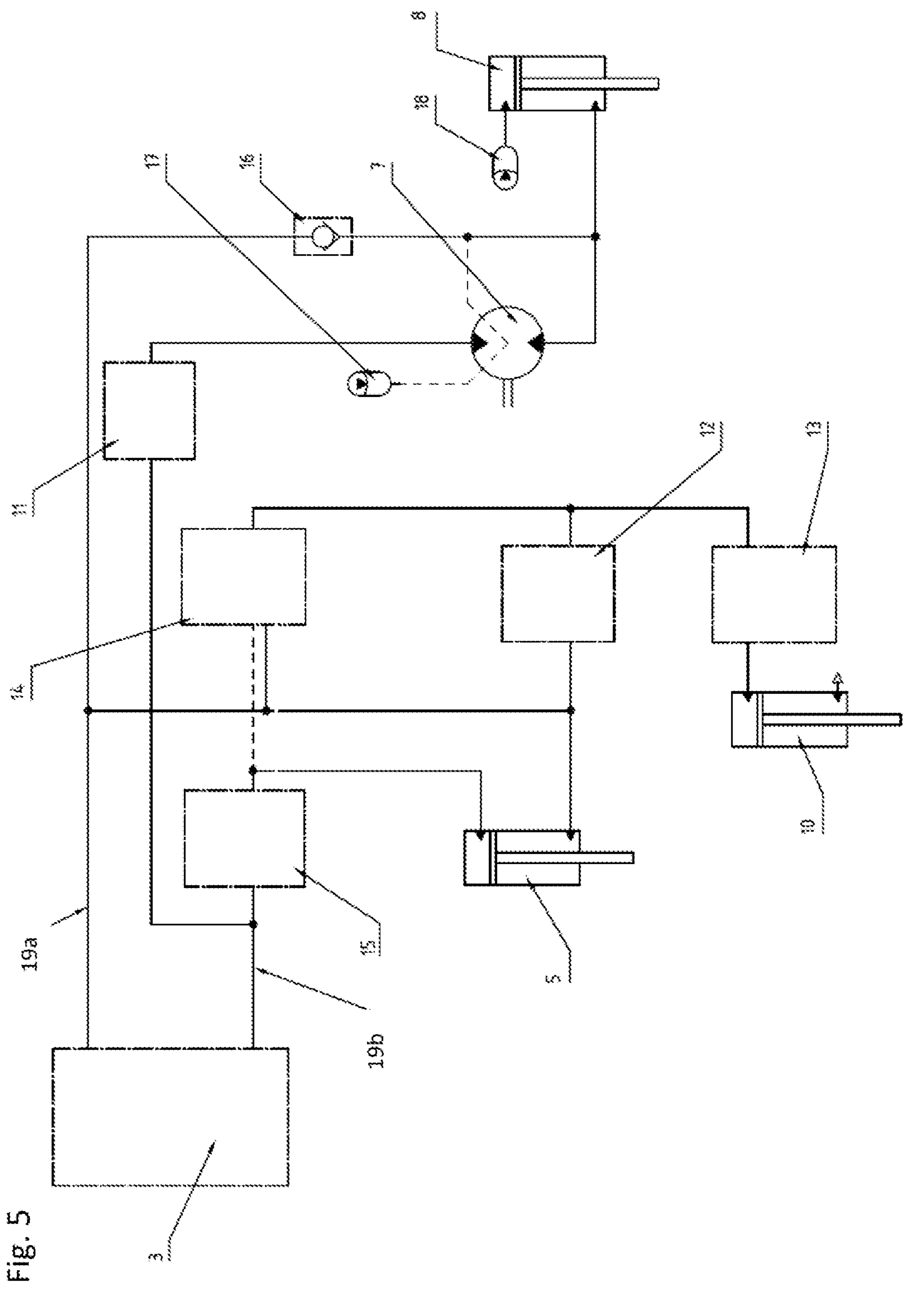

The invention will be explained in more detail below with the aid of exemplary embodiments shown in the accompanying figures, wherein:

FIG. 1 shows a schematic view of a vehicle having a felling head according to the invention with a gripper and saw unit in the cutting position, FIG. 2 shows a schematic view of a vehicle with a felling head according to the invention with a gripper and saw unit in the depositing position, FIG. 3*a* shows an enlarged view of the felling head in the cutting position, FIG. 3*b* shows an enlarged view of the felling head in the depositing position, FIG. 4*a* shows a view of the gripper and saw unit seen from above, FIG. 4*b* shows a view of the gripper and saw unit seen from below, so that the cutting element is visible, and the FIG. 5 shows a possible embodiment of a hydraulic circuit for a felling head according to the invention.

Reference is first made to FIGS. 1 to 4 in order to explain the general mode of operation of a felling head according to the invention. FIG. 1 shows a schematic view of a vehicle 3 with a felling head 1 according to the invention with a gripper and saw unit in the cutting position, and FIG. 2 shows a schematic view of the vehicle 3 with a felling head 1 according to the invention with a gripper and saw unit in the depositing position.

The felling head 1 is attached to a boom arm of the vehicle 3, which is controlled by an operator from the vehicle 3 in such a way that gripper arms 4 (see FIG. 3) arranged on the gripper and saw unit embrace the harvested material 2, such as a tree trunk. Subsequently, a corresponding hydraulic system exerts a closing pressure on the gripper arms 4 via the second hydraulic line 19*b* shown in FIGS. 1 and 2 and a first hydraulic cylinder 5 (see FIG. 4*a*), which fix the tree trunk in place with a pincer-like movement. After the tree trunk has been fixed, the cutting element 6 (see FIG. 4*b*) can be pivoted using a second hydraulic cylinder 8 so that the tree trunk is cut through. The cutting element 6 is designed as a chainsaw and is usually pivotably mounted in a saw box, wherein it can be put into operation using a hydraulic motor 7 arranged in the saw box (see FIG. 4*b*) and swung out of the saw box using the second hydraulic cylinder 8 in order to cut through a tree trunk held by the gripper arms 4 in an area below the gripper arms 4. After cutting through the tree trunk, the gripper and saw unit can be pivoted using a tilting device 9 (see FIG. 3) so that the gripper arms 4 are moved from their cutting position as shown in FIG. 3*a*, in which the gripper arms 4 are oriented essentially horizontally and their gripper pivot axes are correspondingly vertical, to a depositing position as shown in FIG. 3*b*, in which the gripper arms 4 are oriented essentially vertically and their gripper pivot axes are correspondingly horizontal. The severed tree trunk can then be deposited in a controlled manner by appropriate activation of the boom arm, wherein the gripper arms 4 are opened via the first hydraulic line 19*a* shown in FIGS. 1 and 2 and a correspondingly resetting movement of the first hydraulic cylinder 5 in order to release the severed tree trunk. With the aid of a third hydraulic cylinder 10 (see FIG. 3) and the tilting device 9, the gripper and saw unit can be moved from its depositing position as shown in FIG. 3*b* back to its cutting position as shown in FIG. 3*a*.

A possible embodiment of a hydraulic circuit for a felling head according to the invention is explained below with reference to FIG. 5. If the gripper is to be opened, the first hydraulic cylinder 5 is actuated using the first hydraulic line 19*a* and the gripper opens. With the aid of the first hydraulic valve 12, hydraulic fluid is conducted from the first hydraulic line 19*a* to the second hydraulic valve 13, which is initially still blocked because it is only opened by actuating a switch. In addition, hydraulic fluid is also fed to the third hydraulic valve 14, but this is also still blocked because it is blocked when the first hydraulic line 19*a* is pressurized.

Only when the gripper is fully open and thus in its open position does it activate the second hydraulic valve 13 via a switch, which thus becomes conductive and allows hydraulic fluid to flow from the first hydraulic valve 12 into the third hydraulic cylinder 10 of the tilting device 9. The third hydraulic cylinder 10 is thus actuated, causing the tilting device 9 to pivot the gripper and saw unit into its cutting position.

The gripper and saw unit can then be positioned on the harvested material. The two hydraulic lines 19*a*, 19*b* are depressurized in this case. The third hydraulic valve 14 remains in the blocking state. The hydraulic fluid cannot flow out of the third hydraulic cylinder 10 via the first hydraulic valve 12 either, as it is fitted with a non-return valve. The gripper and saw unit thus holds its position and enables precise positioning on the harvested material 2.

If the gripper is to be closed, the first hydraulic cylinder 5 is actuated using the second hydraulic line 19*b* and the gripper closes. The third hydraulic valve 14 is now opened so that hydraulic fluid can flow out of the third hydraulic cylinder 10 via the second hydraulic valve 13 and the third hydraulic valve 14 into the first hydraulic line 19*a* as soon as the harvested material 2 has been cut through and pivots the tilting device 9 with its own weight, bringing the third hydraulic cylinder 10 back into its retracted position. The third hydraulic valve 14 is opened when pressure is applied to the second hydraulic line 19*b* with the aid of a control line, indicated by a dashed line in FIG. 5, which is used to reduce the pressure in the second hydraulic line 19*b* downstream of a fourth hydraulic valve 15 of the first hydraulic cylinder 5, designed as a load-holding valve, to control the third hydraulic valve 14.

For overload protection for the third hydraulic cylinder 10, the first hydraulic valve 12 is also designed to direct hydraulic fluid from the second hydraulic valve 13 to the first hydraulic line 19*a* if a first limit value of the pressure applied on the output side is exceeded.

Furthermore, a fourth hydraulic valve 15 is provided as the aforementioned load-holding valve with an overload protection also for the first hydraulic cylinder 5, which is connected on the input side to the second hydraulic line 19*b* and on the output side to the first hydraulic cylinder 5, wherein the fourth hydraulic valve 15 is designed to conduct hydraulic fluid from the first hydraulic cylinder 5 to the second hydraulic line 19*b* if a second limit value of the pressure on the output side is exceeded. The fourth hydraulic valve 15 thus prevents the gripper from opening unintentionally, but allows the gripper to open in the event of an imminent overload.

In addition, a fifth hydraulic valve 11 is provided, which is connected on the input side to the second hydraulic line 19*b* and on the output side to the hydraulic motor 7 and the second hydraulic cylinder 8 for the cutting element 6, wherein the fifth hydraulic valve 11 is designed to conduct hydraulic fluid from the second hydraulic line 19*b* to the hydraulic motor 7 and the second hydraulic cylinder 8 when the pressure on the input side exceeds a third limit value. The third limit value is selected so that the fifth hydraulic valve 11 only opens when the gripper is fully closed. In this way, the cutting element 6 is also not put into operation until the gripper is completely closed. After start-up, the saw is swung out via the hydraulic motor 7 using the second hydraulic cylinder 8.

Furthermore, a first accumulator 17 is provided for leakage oil from the hydraulic motor 7, which is connected to the first hydraulic line 19*a*. This first accumulator 17 collects leakage oil from the hydraulic motor 7 and returns it to the first hydraulic line 19*a* after the sawing process has been completed.

In order to prevent the hydraulic motor 7 from looping incorrectly when pressure is applied to the first hydraulic line 19*a*, a sixth hydraulic valve 16 is provided, which is connected on the inlet side to the first hydraulic line 19*a* and on the outlet side to the hydraulic motor 7, wherein the sixth hydraulic valve 16 is designed to conduct hydraulic fluid from the hydraulic motor 7 into the first hydraulic line 19*a* and to block it in the opposite direction.

Furthermore, a second accumulator 18 for hydraulic fluid of the second hydraulic cylinder 8 is provided for the resetting movement of the second hydraulic cylinder 8. With the aid of the second accumulator 18, the cutting element 6 is thus swung back into place after the cutting process has been completed.

With the aid of the invention, a device for timber harvesting with a hydraulically controlled felling head 1 is realized, which enables the cutting position of the gripper and saw unit to be fixed during positioning on the harvested material 2.

The invention claimed is:

1. A device for timber harvesting having a hydraulically controlled felling head attachable to the boom arm of a vehicle and comprises:

a gripper and saw unit and a tilting device, wherein the gripper and saw unit has at least one pair of two gripper arms for the harvested material, actuatable by a first hydraulic cylinder and pivotable between an open and closed state, and a cutting element for cutting through the harvested material pivotable out by a second hydraulic cylinder, and pivotable from a depositing position into a cutting position for the harvested material by the tilting device that is actuatable by a third hydraulic cylinder, wherein the first hydraulic cylinder is connected to a first hydraulic line for opening the gripper arms and to a second hydraulic line for closing the gripper arms, a first hydraulic valve with a non-return valve is connected on the input side to the first hydraulic line, and is connected on the output side to a second hydraulic valve, which is connected to the third hydraulic cylinder configured as a single-acting hydraulic cylinder, and to a third hydraulic valve, via which the second hydraulic valve is connected to the first hydraulic line, wherein the third hydraulic valve is configured to block when pressure is applied to the first hydraulic line and to open when pressure is applied to the second hydraulic line, and the second hydraulic valve is configured to conduct hydraulic fluid from the first hydraulic valve to the third hydraulic cylinder when a switch is actuated by the gripper arms pivoted into their open state, and to conduct hydraulic fluid from the third hydraulic cylinder to the third hydraulic valve when the switch is not actuated when the gripper arms are closed.

2. The device according to claim 1, wherein the first hydraulic valve is configured to conduct hydraulic fluid from the second hydraulic valve to the first hydraulic line when a first limit value of the output-side pressurization is exceeded.

3. The device according to claim 1, further comprising a fourth hydraulic valve configured as a load-holding valve with an overload protection, which is connected on the input side to the second hydraulic line and on the output side to the first hydraulic cylinder, wherein the fourth hydraulic valve is designed to conduct hydraulic fluid from the first hydraulic cylinder to the second hydraulic line when a second limit value of the output-side pressurization is exceeded.

4. The device according to claim 1, further comprising a fifth hydraulic valve, which is connected on the input side to the second hydraulic line and on the output side to a hydraulic motor and the second hydraulic cylinder for the cutting element, wherein the fifth hydraulic valve is designed to conduct hydraulic fluid from the second hydraulic line to the hydraulic motor and the second hydraulic cylinder when a third limit value of the input-side pressurization is exceeded.

5. The device according to claim 1, further comprising a first accumulator for leakage oil of the hydraulic motor, which is connected to the first hydraulic line.

6. The device according to claim 1, further comprising a sixth hydraulic valve, which is connected on the input side to the first hydraulic line and on the output side to the hydraulic motor, wherein the sixth hydraulic valve is designed to conduct hydraulic fluid from the hydraulic motor into the first hydraulic line and to block it in the opposite direction.

7. The device according to claim 1, further comprising a second accumulator for hydraulic fluid of the second hydraulic cylinder for resetting movement of the second hydraulic cylinder.

* * * * *